(12) United States Patent
Eom

(10) Patent No.: US 9,880,016 B2
(45) Date of Patent: Jan. 30, 2018

(54) APPARATUS FOR ROUTE GUIDE AND CONTROL METHOD THEREOF

(71) Applicant: SK TELECOM CO., LTD., Seoul (KR)

(72) Inventor: Tae Wook Eom, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 179 days.

(21) Appl. No.: 14/967,023

(22) Filed: Dec. 11, 2015

(65) Prior Publication Data

US 2016/0313134 A1 Oct. 27, 2016

(30) Foreign Application Priority Data

Apr. 23, 2015 (KR) ........................ 10-2015-0057201

(51) Int. Cl.
  G01C 21/00 (2006.01)
  G01C 21/34 (2006.01)
  G08G 1/01 (2006.01)
  G08G 1/0968 (2006.01)

(52) U.S. Cl.
  CPC ......... G01C 21/3492 (2013.01); G08G 1/012 (2013.01); G08G 1/0112 (2013.01); G08G 1/0133 (2013.01); G08G 1/0141 (2013.01); G08G 1/09685 (2013.01); G08G 1/096816 (2013.01)

(58) Field of Classification Search
  CPC .. G01C 21/3492; G08G 1/0112; G08G 1/012; G08G 1/09685; G08G 1/0141; G08G 1/096816; G08G 1/0133
  See application file for complete search history.

(56) References Cited

U.S. PATENT DOCUMENTS

| 2008/0033640 | A1* | 2/2008 | Amano | G01C 21/3476 701/414 |
| 2014/0114556 | A1* | 4/2014 | Pan | G08G 1/00 701/119 |
| 2015/0019132 | A1* | 1/2015 | Gusikhin | G01C 21/3469 701/537 |
| 2015/0092651 | A1* | 4/2015 | Chow | H04W 72/005 370/312 |
| 2015/0168169 | A1* | 6/2015 | Caceres | G01C 21/3492 701/537 |
| 2016/0012720 | A1* | 1/2016 | Boss | G08G 1/096822 701/118 |
| 2016/0133127 | A1* | 5/2016 | Smereka | G08G 1/0125 701/118 |
| 2016/0282132 | A1* | 9/2016 | Bostick | G01C 21/3415 |
| 2016/0295633 | A1* | 10/2016 | Baligh | H04W 74/08 |

* cited by examiner

Primary Examiner — Hussein Elchanti
(74) Attorney, Agent, or Firm — Hauptman Ham, LLP

(57) ABSTRACT

Disclosed herein are a route guide apparatus and a control method thereof. When a route guide to a specific location is requested, congestion information considering the number of vehicles having already arrived at the specific location at the moment that the route guide is requested and the estimated number of vehicles expected to arrive is generated and provided, such that a user requesting the route guide can learn the congestion information on the specific location in advance.

11 Claims, 9 Drawing Sheets

[ROUTE GUDIE APPARATUS]  [TERMINAL DEVICE]

APPARATUS FOR ROUTE GUIDE AND CONTROL METHOD THEREOF

CROSS-REFERENCE TO RELATED APPLICATIONS

This application is based upon and claims the benefit of priority from Korean Patent Application No. 10-2015-0057201, filed on Apr. 23, 2015, the entire contents of which are incorporated herein by reference.

TECHNICAL FIELD

The present disclosure relates to a method for generating and providing congestion information when a route guide to a specific location is requested, the congestion information considering the number of vehicles having already arrived at the specific location at the moment that the route guide is requested and the estimated number of vehicles expected to arrive.

BACKGROUND

Typically, a route guide service provides a user with map information on which the current location is indicated and/or audible instruction by calculating the current location based on information received from a plurality of GPS satellites, such as latitude, longitude, and altitude.

Such route guide service can monitor an overall traffic condition and provide information on a faster route. For example, a user can be provided with current traffic information such as congested sections, congested states, traffic situations of close areas, etc, and can be guided, in real time, along the shortest route to a destination that bypasses the congested sections.

However, the above-described, typical route guide service can provide only information on routes to the final destination, but cannot provide any information on the location where the route guide is terminated, i.e., the final destination.

SUMMARY

In view of the above, an object of the present disclosure is to provide a scheme for generating and providing congestion information when a route guide to a specific location is requested, the congestion information considering the number of vehicles having already arrived at the specific location at the moment that the route guide is requested and the estimated number of vehicles expected to arrive.

According to one embodiment of the present disclosure, provided is a route guide apparatus, comprising: a counting unit configured to count, when a route guide to a specific location is requested from a terminal device, at least one of the number of vehicles having already arrived at the specific location and the estimated number of vehicles expected to arrive at the specific location; and a congestion information generating unit configured to generate congestion information in connection with the specific location based on the at least one of the number of arrival vehicles and the estimated number of vehicles expected to arrive such that the route guide comprising the congestion information is provided.

In particular, the estimated number of vehicles expected to arrive may include the number of vehicles that have received the route guide to the specific location but have not arrived at the specific location yet.

Alternatively, the estimated number of vehicles expected to arrive may include the number of vehicles that have received the route guide to the specific location and are expected to arrive earlier than the terminal device.

Further, the estimated number of vehicles expected to arrive may include the number of vehicles that have received the route guide to the specific location, their routes to the specific location overlapping with the route of the terminal device more than a threshold distance, but having not arrived at the specific location yet.

Further, the estimated number of vehicles expected to arrive may include the number of arrived vehicles in the past obtained from statistical information at a time point when the terminal device is expected to arrive.

Further, the congestion information may further include the number of vehicles that can be parked in parking lots in the specific location at a time point when the terminal device is expected to arrive.

Further, the congestion information may be generated as guide information on a time basis irrespectively of whether or not a route guide request received from the terminal device, and is provided in real time in response to a request from a service receiver related to the specific location.

On the other hand, according to another embodiment of the present disclosure, provided is a control method of the route guide apparatus, comprising: counting, when a route guide to a specific location is requested from a terminal device, at least one of the number of vehicles having already arrived at the specific location and the estimated number of vehicles expected to arrive at the specific location; and generating congestion information in connection with the specific location based on the at least one of the number of arrival vehicles and the estimated number of vehicles expected to arrive such that the route guide comprising the congestion information is provided.

Alternatively, the estimated number of vehicles expected to arrive may include the number of vehicles that have received the route guide to the specific location but have not arrived at the specific location yet.

Alternatively, the estimated number of vehicles expected to arrive may include the number of vehicles that have received the route guide to the specific location and are expected to arrive earlier than the terminal device but not arrived at the specific location yet.

Alternatively, the estimated number of vehicles expected to arrive may include the number of vehicles that have received the route guide to the specific location, their routes to the specific location overlapping with the route of the terminal device more than a threshold distance, but having not arrived at the specific location yet.

Alternatively, the estimated number of vehicles expected to arrive may include the number of arrived vehicles in the past obtained from statistical information at a time point when the terminal device is expected to arrive.

Alternatively, the congestion information may further include the number of vehicles that can be parked in parking lots in the specific location at a time point when the terminal device is expected to arrive.

Alternatively, the congestion information may be generated as guide information on a time basis irrespectively of whether or not a route guide request received from the terminal device, and is provided in real time in response to a request from a service receiver related to the specific location.

Accordingly, the route guide apparatus and the control method thereof according to the present disclosure generates and provide congestion information when a route guide forward to a specific location is requested, the congestion information considering the number of vehicles having already arrived at the specific location at the moment that the route guide is requested and the estimated number of vehicles expected to arrive is generated and provided, such that a user requesting the route guide can previously learn the congestion information on the specific information.

DETAILED DESCRIPTION

Figure 1:
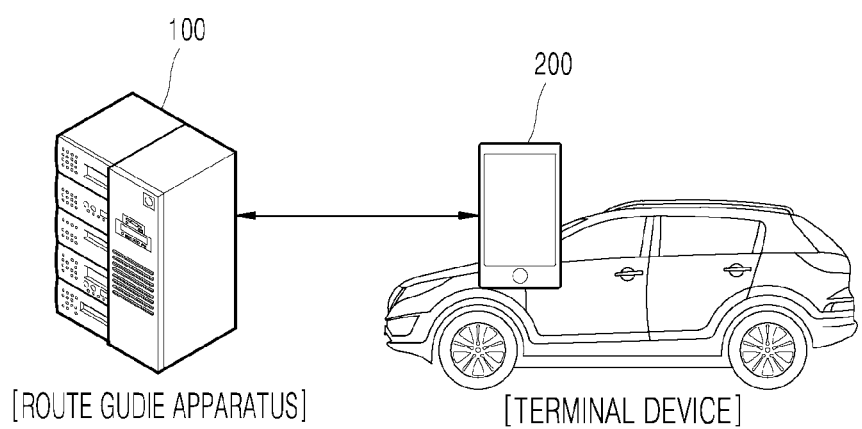
FIG. 1 is a schematic block diagram of a route guide system according to an embodiment of the present disclosure.

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present invention.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit are not to be construed to be limited by the appended figures.

Hereinafter, an embodiment of the present disclosure will be described with reference to the accompanying drawings.

FIG. 1 is a block diagram of a route guide system according to an embodiment of the present disclosure.

As shown in FIG. 1, the route guide system according to an embodiment of the present disclosure includes a route guide apparatus 100 for providing a route guide and a terminal device 200 for requesting the route guide to a specific location.

The route guide apparatus 100 refers to a server for monitoring the overall traffic condition to provide the terminal device 200 with a smooth route to a destination as a route guide when a route guide to a specific location is requested from the terminal device 200.

The terminal device 200, which refers to an apparatus for requesting to the route guide apparatus 100 the route guide to the specific location set as the destination by a user and receiving the route guide therefrom, requests to the route guide apparatus 100 the route guide from a current position to the specific location set as the destination.

To do so, the terminal device 200 determines the current position, e.g., using a GPS (Global Positioning System) or the like in order to, e.g., provide different positioning data such as latitude, longitude, and altitude.

For example, the terminal device may include a mobile device held by the user such as a smart phone, a tablet PC, a PDA, and a notebook, or a separate device mounted onto a vehicle but is not limited thereto, and nay more, all apparatuses capable of communicating with the route guide apparatus 100 and determining the current position.

According to an embodiment of the present disclosure, a route guide service is provided which can monitor the overall traffic condition and guide a smooth route to the user.

The route guide service instructs the current flow information such as, e.g., congested sections, congested states, traffic situations of neighboring areas and the like, and provides a variety of information in connection with a shortest route and so on for enabling the congested sections to be avoided up until arriving at a destination.

However, the route guide service provides a variety of information in connection with the route up to the destination as disclosed above as well as requires the needs to provide information relevant to the destination.

For example, it may be assumed that a user carrying the terminal device 200 is going to visit a specific location that is likely to be crowded with people, such as a tourist spot, an amusement park, an exhibition center, a supermarket.

In such a case, information on how many visitors have visited the destination currently, or information on how much the destination is expected to be congested when the user actually arrives at the destination (hereinafter referred to as "congestion information") may be more useful than information on the route to the destination.

Accordingly, if the congestion information on the specific location is provided together with the route guide when the route guide to the specific location is requested from the terminal device 200, the user carrying the terminal device 200 may utilize the above-mentioned congestion information in determining whether or not to visit the destination before departing.

Accordingly, an embodiment of the present disclosure proposes a way to provide the congestion information on the destination together with the route guide when the route guide is requested from the terminal device 200. Hereinafter, the route guide apparatus 100 and the terminal device 200 for realizing it will be described in detail.

First, a configuration of the route guide apparatus 100 according to an embodiment of the present disclosure is described in more detail with reference to FIG. 2.

Figure 2:
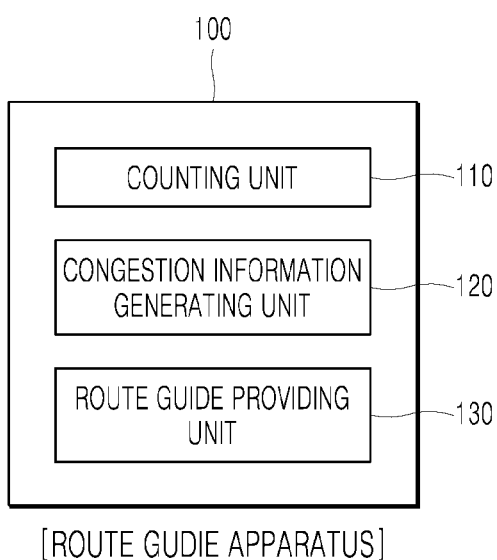
FIG. 2 is a schematic block diagram of a route guide apparatus according to an embodiment of the present disclosure.

As shown in FIG. 2, the route guide apparatus 100 according to an embodiment of the present disclosure may include a counting unit 110 for counting the number of vehicles having already arrived at the specific location and the estimated number of vehicles expected to arrive at the location, in response to the request for a route guide to a specific location from the terminal device 200, a congestion information generating unit 120 for generating congestion information on the specific location, and a route guide providing unit 130 for providing the route guide together with the generated congestion information.

An entire or at least a part of configurations of the route guide apparatus 100 including the counting unit 110, the congestion information generating unit 120, and the route guide providing unit 130 may be implemented in form of a software module executed by a processor, a hardware module, or a combination of the software module and the hardware module.

Eventually, the route guide apparatus 100 according to an embodiment generates the congestion information on the specific location through the above-described configurations and provides it together with the route guide, each of which configurations of the route guide apparatus 100 for doing so will be specifically described hereinafter.

The counting unit 110 performs a function of counting the number of arrival vehicles and the estimated number of vehicles expected to arrive.

More particularly, when a route guide request for a specific location is received from the terminal device 200, the counting unit 110 counts the number of vehicles having already arrived at the specific location up to the moment that the route guide request is received and the estimated number of vehicles expected to arrive.

The number of arrival vehicles refers to the number of visitor vehicles counted to have already arrived at the specific location through the route guide to the specific location. To count the number of arrival vehicles as such, it is obvious to those skilled in the art that historical information has to be managed, which includes information on histories of provided route guides to the specific location, on whether to arrive at the specific location through the route guide, or the like.

Accordingly, when the route guide request for the specific location is received from the terminal device 200, the counting unit 110 can count the number of arrival vehicles having arrive at the specific location through a manner of identifying the above-mentioned historical information up to the moment that the route guide request is received from the terminal device 200.

The estimated number of vehicles expected to arrive refers to the number of visitor vehicles expected to arrive at the specific location before the terminal device 200 or a vehicle mounting the terminal device 200 arrives at the specific location (hereinafter referred to as "an expected arrival time").

The estimated number of vehicles expected to arrive can be counted by identifying a vehicle (receiver) receiving the route guide to the specific location, or by inquiring period statistical information in connection with the arrival vehicles.

In case of identifying a vehicle (receiver) receiving the route guide to the specific location, the counting unit 110 may determine the number of vehicles that have received the route guide to the specific location and are expected to arrive at the same time as or earlier than the terminal device 200 or a vehicle mounting the terminal device 200 as the estimated number of vehicles expected to arrive.

There may be a vehicle that has received the route guide to the specific location and has the same departure as that of the terminal device 200 or a vehicle mounting the terminal device 200. In this case, it may be anticipated that route of the vehicle having the same departure substantially matches to a route to be guided to the terminal device 200.

Accordingly, in order to consider the vehicle having the same departure as that of the terminal device 200 or a vehicle mounting the terminal device 200, the counting unit 110 may determine the number of vehicles that have received the route guide to the specific location, their routes to the specific location overlapping with the route of the terminal device more than a threshold distance but having not arrived at the specific location yet, as the estimated number of vehicles expected to arrive.

As such, determining whether a route from the vehicle to the specific location coincides with that of the terminal device 200 or a vehicle mounting the terminal device 200 more than a threshold distance is for considering a non-arriver having the same departure but different route, and thus may anticipate traffic congestion which may be incurred by the non-arriver in any section along the route of the terminal device 200 or the vehicle mounting the terminal device 200.

Further, in case of inquiring the period statistical information in connection with the arrival vehicles, the counting unit 110 inquires the period statistical information, which the numbers of past arrival vehicles are accumulated, e.g., on a time basis, on a day basis, on a day of week basis, on a event basis, and therethrough determines, as the number of the arrival schedule vehicles, the number of the past arrival vehicles having already arrived at the same time point as the time point when the terminal device 200 or a vehicle mounting the terminal device 200 is expected to arrive.

The congestion information generating unit 120 performs a function of generating congestion information.

More particularly, when the number of arrival vehicles and the estimated number of vehicles expected to arrive the specific location are counted, the congestion information generating unit 120 uses at least one of the counted numbers of arrival vehicles and arrival schedule vehicles to generate the congestion information.

The congestion information generating unit 120 may generate, as each congestion information, the number of arrival vehicles at the time point when the route guide is requested from the terminal device 200 and the estimated number of vehicles expected to arrive at the time point when the terminal device 200 or a vehicle mounting the terminal device 200 is expected to arrive, or generate, as congestion information, the total number of visitors, corresponding to a result of summing the number of arrival vehicles and the estimated number of vehicles expected to arrive, at a time point when the terminal device 200 is expected to arrive.

When the estimated number of vehicles expected to arrive is counted from the period statistical information, it is reasonable that the number of arrival vehicles at the time point when the route guide is requested from the terminal device 200 may be exceptionally neglected and only the number of past arrival vehicles counted from the period statistical information is estimated to be the total number of visitors, thereby generating the congestion information.

For reference, the number of arrival vehicles at the time point when the route guide is requested from the terminal device 200 may be compared against the period statistical information.

That is to say, the congestion information generating unit 120 may check up a ratio of the number past arrival vehicles counted from the period statistical information related with a time point when the route guide is requested from the terminal device 200 to the number of actual arrival vehicles.

The checked ratio may additionally be reflected onto the number of past arrival vehicles counted from the period statistical information with respect to the expected arrival time of the terminal device 200 or the vehicle mounting the terminal device 200, such that the congestion information may be generated considering the checked ratio.

For example, if the number of actual arrival vehicles at the time point when the route guide is requested from the terminal device 200 is more than the number of past arrival vehicles by a ratio of 120%, it may be anticipated that the number of past arrival vehicles counted from the period statistical information with respect to the expected arrival time of the terminal device 200 or the vehicle mounting the terminal device 200 may be varied.

Accordingly, the congestion information generating unit 120 may finally reflect the previously checked ratio of 120% onto the number of past arrival vehicles counted from the period statistical information with respect to the expected arrival time of the terminal 200 or the vehicle mounting the terminal device 200, such that the number of arrival vehicles more than the number of past arrival vehicles at the expected arrival time of the terminal device 200 by 120% is estimated to be the total number of visitors, thereby generating the congestion information.

Moreover, the congestion information may further include the number of vehicles that can be parked in parking lots in a destination at the time point when the vehicle having the terminal device 200 arrives. In order to provide the number of vehicles that can be parked in parking lots in the destination, it will be obvious to those skilled in the art that the terminal device has to be linked to a parking system built in the destination.

The route guide providing unit 130 performs a function of providing congestion information.

More particularly, when the congestion information on the specific location set as the destination by the terminal device 200 is generated, the route guide providing unit 130 may provide it together with the route guide to the specific location to the terminal device 200 such that a user carrying the terminal device 200 can previously discern the congestion information on the specific location.

As mentioned above, the respective configurations within the route guide apparatus 100 may be implemented in form of a software module executed by a processor, a hardware module, or a combination of the software module and the hardware module.

As such, the form of a software module executed by a processor, a hardware module, or a combination of the software module and the hardware module would be able to be implemented in a hardware system (e.g., a computer system).

Therefore, a hardware system 1000 for implementing the route guide apparatus 100 according to an embodiment of the present disclosure will be described hereinafter with reference to FIG. 3.

For reference, it should be kept in mind that the disclosure described below is an example for implementing the above-described respective configurations within the terminal device 200 and the respective configurations and the operation thereof may be different from an actual system.

Figure 3:
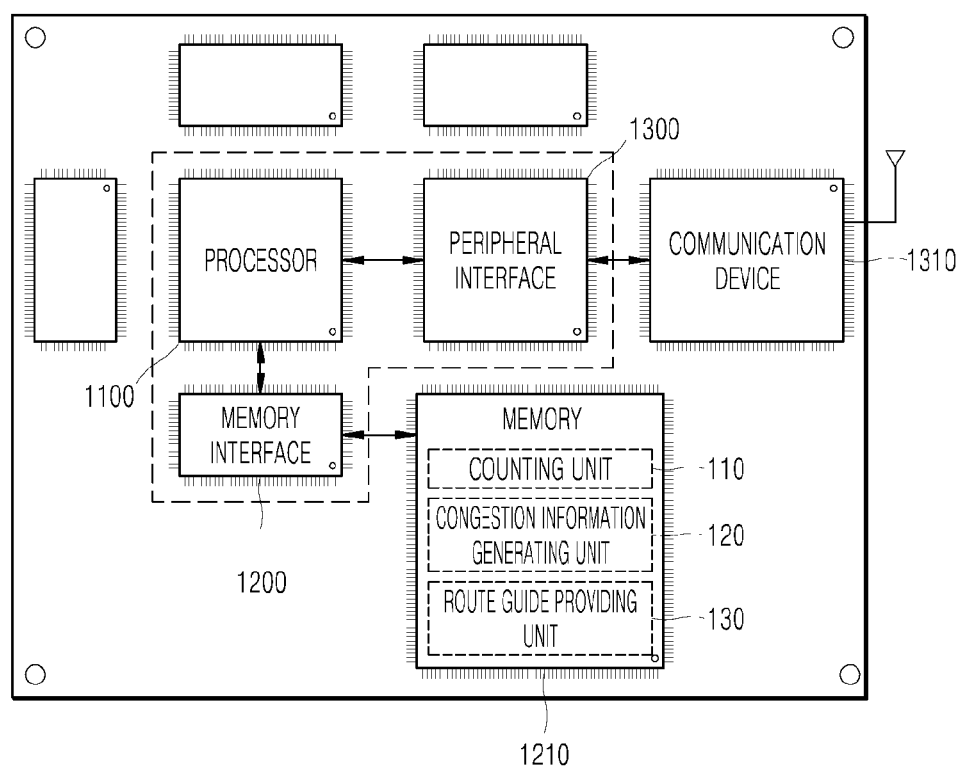
FIG. 3 is a schematic block diagram of a hardware system for implementing a route guide apparatus according to an embodiment of the present disclosure.

FIG. 3 is a block diagram illustrating a structure of the hardware system 1000 for implementing the route guide apparatus 1000 according to an embodiment of the present disclosure.

As shown in FIG. 3, the hardware system 1000 according to an embodiment of the present disclosure may have configurations including a processor 1100, a memory interface 1200, and a peripheral interface 1300.

Such respective configurations within the hardware system 1000 may be distinct components or be integrated in one or more integrated circuit, and the respective configurations may be connected to a bus system (not shown).

The bus system is an abstraction of indicating suitable bridges, adaptors, and/or any one or more physical buses, communications lines/interfaces, and/or multi-drop or point-to-point connections coupled by controllers.

The processor 1100 communicates with a memory 1210 via the memory interface 1200 in order to perform a variety of functions in the hardware system and thus execute various software modules stored in the memory 1210.

The memory 1210 may store the respective configurations within the route guide apparatus 100 as described with reference to FIG. 2, i.e., the counting unit 110, the congestion information generating unit 120, and the route guide providing unit 130 in a form of software modules, and then further store an operation system.

The operation system (for instance, an embedded operation system such as I-OS, Android, Darwin, RTXC, LINUX, UNIX, OS X, WINDOWS, or VxWorks) includes various procedures, instruction sets, software components and/or drivers for controlling and managing general system works (for example, a memory management, a storage device control, a power management, and so on), and facilitates the communication among the various hardware modules and the software modules.

For reference, the memory 1210 may include a memory hierarchy including a cache, a main memory, and a secondary memory but being not limited thereto, wherein the memory hierarchy may be implement in any combination of, e.g., RAM (for instance, SRAM, DRAM, DDRAM), ROM, FLASH, magnetic and/or optical storage device [for instance, disk drive, magnetic tape, CD (compact disk), DVD (digital video disk), and so on].

The peripheral interface 1300 enables the communication between the processor 1100 and peripherals.

The peripherals mentioned above is for providing different functions to the computer system and, in an embodiment of the present disclosure, may include, e.g., a communication device 1310.

The communication device 1310 provides a function of communicating with other devices. For doing so, it includes an antenna system, a RF receiver, one or more amplifiers, a tuner, one or more oscillators, a digital signal processor, a codec chipset, a memory and so on without the limitations thereto, and may include any known circuits for performing the function.

In this case, communication protocols supporting the communication device 1310 may include protocols for, e.g., a LTE (Long Term Evolution), a TDMA (time division multiple access), a CDMA (code division multiple access), a GSM (global system for mobile communications), an EDGE (Enhanced Data GSM Environment), a W-CDMA (wideband code division multiple access), a Wi-Fi (IEEE 802.11a, IEEE 802.11b, IEEE 802.11g, IEEE 802.11n and/or the like), a bluetooth, a Wi-MAX, VoIP (Voice over Internet Protocol), an e-mail, an instant messaging and SMS (short message service), and so on without the limitations thereto, and may include all protocols capable of providing environments communicating with other devices.

Accordingly, the respective configurations within the terminal device 200 stored on the memory 1210 in a form of software modules may perform the communication with the communication device 1310 through the memory interface 1200 and the peripheral interface 1300 when they are executed by the processor 1100, thereby generating the congestion information and then providing it together with the route guide.

Hereinafter, the respective configurations within the hardware system 1000 related to the route guide apparatus 100 will be described in detail with reference to FIG. 3 and it is assumed for the sake of convenience of explanation that the respective configurations within the route guide apparatus 100 stored on the memory 1210 in a form of software modules is in a state of being executed by the processor 1100.

The counting unit 110 performs the function of counting the number of arrival vehicles and the estimated number of vehicles expected to arrive.

More particularly, when the route guide request to the specific location transmitted from the terminal device 200 is received by the communication device 1310, the counting unit 110 counts the number of vehicles having already arrived and the estimated number of vehicles expected to arrive at the specific location up to the time point when the route guide request is received from the terminal device 200, and then the delivers counting result to the congestion information generating unit 120.

The number of arrival vehicles refers to the number of visitor vehicles counted to have already arrived at the specific location through the route guide to the specific location. To count the number of arrival vehicles as such, it is reasonable to manage historical information, which includes information on histories of having provided route guides to the specific location, on whether to arrive at the specific location through the route guide, or the like.

Accordingly, when the route guide request for the specific location is received from the terminal device 200, the counting unit 110 can count the number of arrival vehicles having arrive at the specific location through a manner of identifying the above-mentioned historical information up to the moment that the route guide request is received from the terminal device 200.

The estimated number of vehicles expected to arrive refers to the number of visitor vehicles expected to arrive at the specific location before terminal device 200 or a vehicle mounting the terminal device arrives at the specific location.

The estimated number of vehicles expected to arrive can be counted by identifying a vehicle (receiver) receiving the route guide to the specific location, or by inquiring period statistical information in connection with the arrival vehicles.

In case of identifying a vehicle (receiver) receiving the route guide to the specific location, the counting unit 110 may determine the number of vehicles that have received the route guide to the specific location and are expected to arrive at the same time as the terminal device 200 or a vehicle mounting the terminal device 200 as the estimated number of vehicles expected to arrive.

It may be assumed that there may be any receiver that has received the route guide to the specific location and has the same departure as that of the terminal device 200 or a vehicle mounting the terminal device 200. In this case, it may be anticipated that route of the receiver having the same departure matches to a route to be guided to the terminal device 200.

Accordingly, in order to consider the receiver having the same departure as that of the terminal device 200 or a vehicle mounting the terminal device 200, the counting unit 110 may determine the number of vehicles that have received the route guide to the specific location, their routes to the specific location overlapping with the route of the terminal device more than a threshold distance but having not arrived at the specific location yet, as the estimated number of vehicles expected to arrive.

As such, determining whether a route from the receiver to the specific location coincides with that of the terminal device 200 or a vehicle mounting the terminal device 200 more than a threshold distance is for considering a non-arriver having the same departure but different route, and thus may anticipate traffic congestion which may be incurred by the non-arriver in any section along the route of the terminal device 200 or the vehicle mounting the terminal device 200.

Further, in case of inquiring the period statistical information in connection with the arrival vehicles, the counting unit 110 inquires the period statistical information, which the numbers of past arrival vehicles are accumulated, e.g., on a time basis, on a day basis, on a day of week basis, on a event basis, and therethrough determines, as the number of the arrival schedule vehicles, the number of the past arrival vehicles having already arrived at the same time point as the time point when the terminal device 200 or a vehicle mounting the terminal device 200 is expected to arrive.

The congestion information generating unit 120 performs a function of generating congestion information.

More particularly, when the counting result of the number of arrival vehicles and the estimated number of vehicles expected to arrive to the specific location are received, the congestion information generating unit 120 uses at least one of the counted numbers of arrival vehicles and arrival schedule vehicles to generate the congestion information and then delivers the generated result to the route guide providing unit 130.

The congestion information generating unit 120 may generate, as each congestion information, the number of arrival vehicles at the time point when the route guide is requested from the terminal device 200 and the estimated number of vehicles expected to arrive at the time point when the terminal device 200 or a vehicle mounting the terminal device 200 is expected to arrive, or generate, as congestion information, the total number of visitors, corresponding to a result of summing the number of arrival vehicles and the estimated number of vehicles expected to arrive, at a time point when the terminal device 200 is expected to arrive.

The route guide providing unit 130 performs a function of providing congestion information.

More particularly, when the congestion information on the specific location is received, the route guide providing unit 130 may provide it together with the route guide to the specific location to the terminal device 200 through the communication device 1310 such that a user carrying the terminal device 200 can previously discern the congestion information on the specific location where the user oneself set as the destination.

Hereinafter, configurations of the terminal device 200 according to an embodiment of the present disclosure will be described in more detail with reference to FIG. 4.

Figure 4:
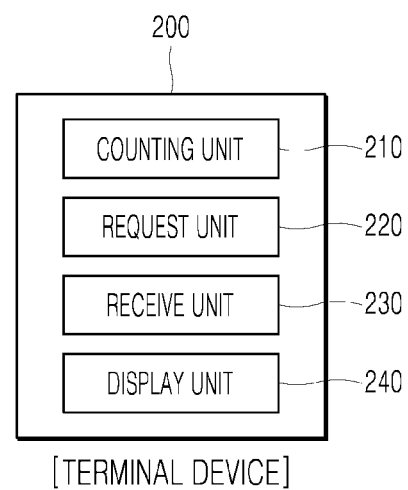
FIG. 4 is a schematic block diagram of a terminal device according to an embodiment of the present disclosure.

As shown in FIG. 4, the terminal device 200 according to an embodiment of the present disclosure has configurations including a counting unit 210 for counting current position, a request unit 220 for requesting a route guide, a receive unit 230 for receiving the route guide, and a display unit 240 for displaying the route guide.

An entire or at least a part of configurations of the terminal device 200 including the counting unit 210, the request unit 220, the receive unit 230, and the display unit 240 may be implemented in form of a software module executed by a processor, a hardware module, or a combination of the software module and the hardware module.

Eventually, the terminal device 200 according to an embodiment receives the route guide including the congestion information through the above-described, each of which configurations of the terminal device 200 for doing so will be specifically described hereinafter.

The counting unit 210 performs a function for counting the current position.

More particularly, the counting unit 210 counts the current position corresponding to a departure of the terminal device 200 in connection with a route guide request.

The counting unit 210 counts the current position, e.g., using a GPS (Global Positioning System) or the like for providing different positioning data such as latitude, longitude, and altitude without the limitations thereto.

The request unit 220 performs a function for requesting the route guide.

More particularly, when a specific location is set as a destination by a user, the request unit 220 generates the route guide request to the specific location and delivers it to the route guide apparatus 100.

Of course, the current position of the terminal device 200 is included in the route guide request.

The receive unit 230 performs a function for receiving the route guide.

More particularly, the receive unit 230 receives the route guide including the congestion information with respect to the specific location from the route guide apparatus 100 according to the route guide request.

The display unit 240 performs a function for displaying the route guide.

More particularly, the display unit 240 displays the route guide to the specific location, received from the route guide apparatus 100, together with the congestion information on the specific location, such that the user carrying the terminal device 200 can learn in advance the congestion information on the specific location where the user oneself set as the destination.

As mentioned above, the respective configurations within the terminal device 200 may be implemented in form of a software module executed by a processor, a hardware module, or a combination of the software module and the hardware module.

As such, the form of a software module executed by a processor, a hardware module, or a combination of the software module and the hardware module would be able to be implemented in a hardware system (e.g., a computer system).

Therefore, a hardware system for implementing the terminal device 200 according to an embodiment of the present disclosure will be described hereinafter. Prior to such description, it should be recognized that the disclosure described below is an example for implementing the foregoing respective configurations within the terminal device 200 and the respective configurations and the operation thereof may be different from an actual system.

Figure 5:
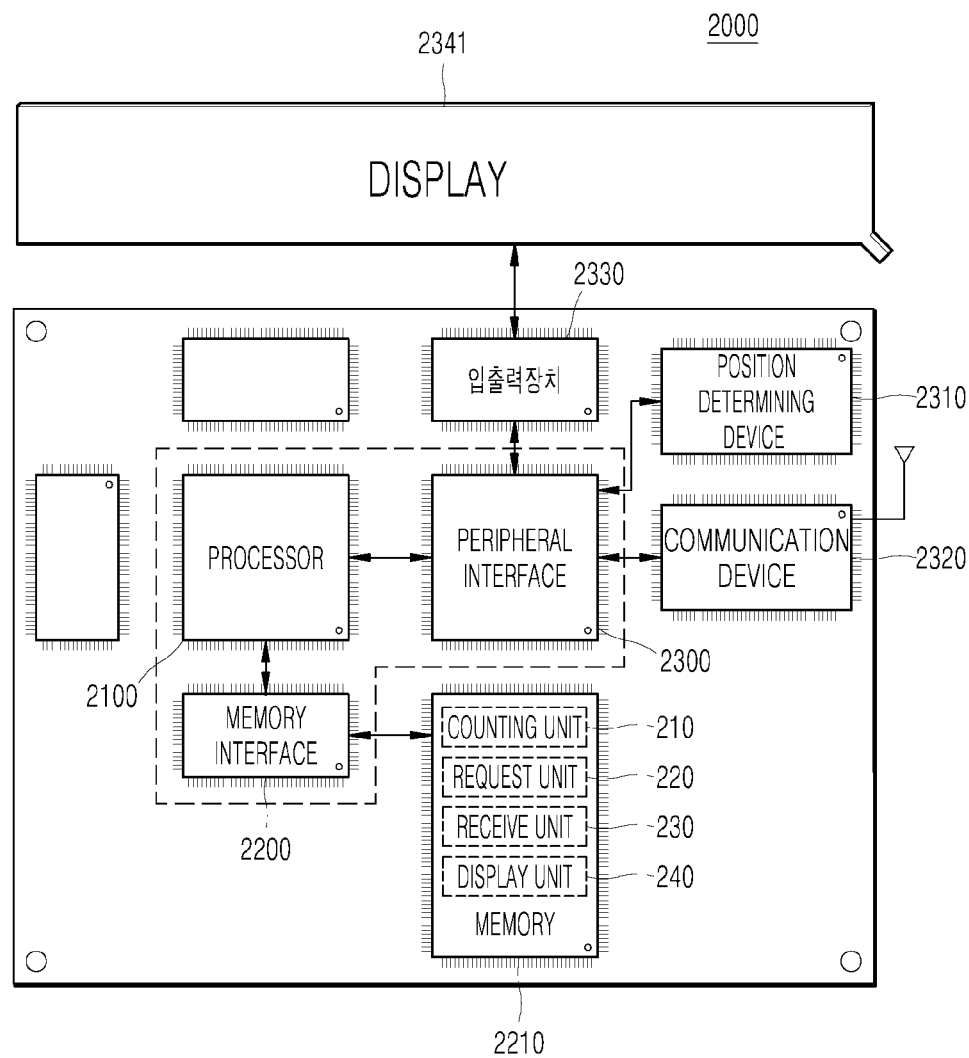
FIG. 5 is a schematic block diagram of a hardware system for implementing a terminal device according to an embodiment of the present disclosure.

FIG. 5 is a block diagram illustrating a structure of a hardware system for implementing the terminal device 200 according to an embodiment of the present disclosure.

As shown in FIG. 5, the hardware system 2000 according to an embodiment of the present disclosure may have configurations including a processor 2100, a memory interface 2200, and a peripheral interface 2300.

Such respective configurations within the hardware system 1000 may be distinct components or be integrated in one or more integrated circuit, and the respective configurations may be connected to a bus system (not shown).

The bus system is an abstraction of indicating suitable bridges, adaptors, and/or any one or more physical buses, communications lines/interfaces, and/or multi-drop or point-to-point connections coupled by controllers.

The processor 2100 communicates with a memory 2210 via the memory interface 2200 in order to perform a variety of functions in the hardware system and thus execute various software modules stored in the memory 2210.

The memory 1210 may store the respective configurations within the terminal device 200 described with reference to FIG. 4, i.e., the counting unit 210, the request unit 220, the receive unit 230, and the display unit 240, in a form of software modules, and then further store an operation system (OS) 150.

The operation system 150 (for instance, an embedded operation system such as I-OS, Android, Darwin, RTXC, LINUX, UNIX, OS X, WINDOWS, or VxWorks) includes various procedures, instruction sets, software components and/or drivers for controlling and managing general system works (for example, a memory management, a storage device control, a power management, and so on), and facilitates the communication among the various hardware modules and the software modules.

For reference, the memory 2210 may include a memory hierarchy including a cache, a main memory, and a secondary memory but being not limited thereto, wherein the memory hierarchy may be implement in any combination of, e.g., RAM (for instance, SRAM, DRAM, DDRAM), ROM, FLASH, magnetic and/or optical storage device [for instance, disk drive, magnetic tape, CD (compact disk), DVD (digital video disk), and so on].

The peripheral interface 2300 enables the communication between the processor 2100 and peripherals.

The peripherals mentioned above is for providing different functions to the computer system and, in an embodiment of the present disclosure, may include, e.g., a position determining device 2310, a communication device 2320, and an input/output device 2330.

The position determining device 2310 refers to, e.g., a position sensor, and in an embodiment of the present disclosure, a GPS (Global Positioning System) for providing different positioning data such as latitude, longitude, and altitude may be applied thereto.

The communication device 1310 provides a function of communicating with other devices. For doing so, it includes an antenna system, a RF receiver, one or more amplifiers, a tuner, one or more oscillators, a digital signal processor, a codec chipset, a memory and so on without the limitations thereto, and may include any known circuits for performing the function.

In this case, communication protocols supporting the communication device 2320 may include protocols for, e.g., a LTE (Long Term Evolution), a TDMA (time division multiple access), a CDMA (code division multiple access), a GSM (global system for mobile communications), an EDGE (Enhanced Data GSM Environment), a W-CDMA (wideband code division multiple access), a Wi-Fi (IEEE 802.11a, IEEE 802.11b, IEEE 802.11g, IEEE 802.11n and/or the like), a bluetooth, a Wi-MAX, VoIP (Voice over Internet Protocol), an e-mail, an instant messaging and SMS (short message service), and so on without the limitations thereto, and may include all protocols capable of providing environments communicating with other devices.

The input/output device 2330 serves as a controller for controlling an I/O device linked with other hardware systems, and in an embodiment of the present disclosure, may be in charge of controlling a display 1321 capable of displaying, e.g., various service screen.

Accordingly, the respective configurations within the terminal device 200 stored on the memory 2210 in a form of software modules may perform the communication with the position determining device 2310, the communication device 2320, and the input/output device 2330 through the memory interface 2200 and the peripheral interface 2300 when they are executed by the processor 2100, thereby receiving the congestion information together with the route guide from the route guide apparatus 100 and then displaying them.

Hereinafter, the respective configurations within the hardware system 2000 performing the positional detection will be described in detail with reference to FIG. 5 and it is assumed for the sake of convenience of explanation that the respective configurations within the terminal device 200 stored on the memory 2210 in a form of software modules is in a state of being executed by the processor 2100 through the memory interface 2200.

The counting unit 210 performs a function for counting the current position. More particularly, the counting unit 210 counts the current position corresponding to a departure of the terminal device 200 in connection with a route guide request through the position determining device 2310 and delivers the counted result to the request unit 220.

The request unit 220 performs a function for requesting the route guide.

More particularly, when the current position of the terminal device 200 is received and a specific location is set as a destination by a user, the request unit 220 generates the route guide request to the specific location and delivers the generated route guide request to the route guide apparatus 100 through the communication device 2320.

The receive unit 230 performs a function for receiving the route guide.

More particularly, the receive unit 230 receives the route guide provided from the route guide apparatus 100 through the communication device 2320 according to the foregoing guide request and then delivers it to the display unit 240.

The display unit 240 performs a function for displaying the route guide.

More particularly, when the route guide is received, the display unit 240 displays the received route guide on a display 2341 through the input/output device 2300 and also displays the congestion information together with the route guide, such that the user carrying the terminal device 200 can learn in advance the congestion information on the specific location where the user oneself set as the destination.

As seen above, in the route guide apparatus 100 and the terminal device 200 according to an embodiment of the present disclosure, when the route information on the specific location is requested from the terminal device 200, the route guide apparatus 100 generates the congestion information considering the number of arrival vehicle having already arrived at the specific location and the estimated number of vehicles expected to arrive and then provides it to the terminal device 200, such that the user having requested the route guide can learn in advance the congestion information on the specific location.

For reference, although an embodiment of the present disclosure propose a configuration that the congestion information generated by the route guide apparatus 100 is provided to the terminal device 200 which has requested the route guide to the specific location, the configuration is not limited thereto and the congestion information may further be provided to a manager managing a workplace in the specific location. In this case, it may be anticipated that the manager may learn the number of visitor vehicles coming to the current workplace based on the congestion information and thus may take actions in advance such as preparing a parking space, getting parking attendants ready, and so on.

Figure 6:
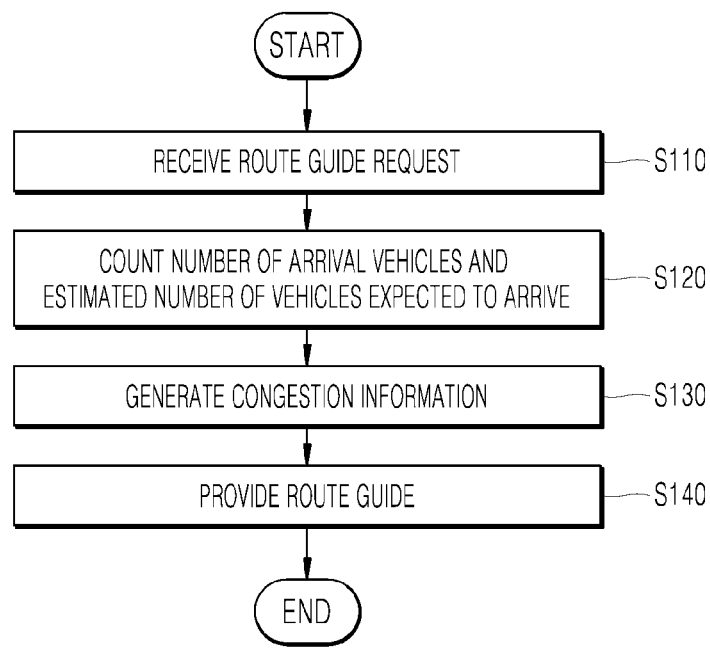
FIG. 6 is a flowchart for illustrating an operational flow in a route guide apparatus according to an embodiment of the present disclosure.
Figure 7:
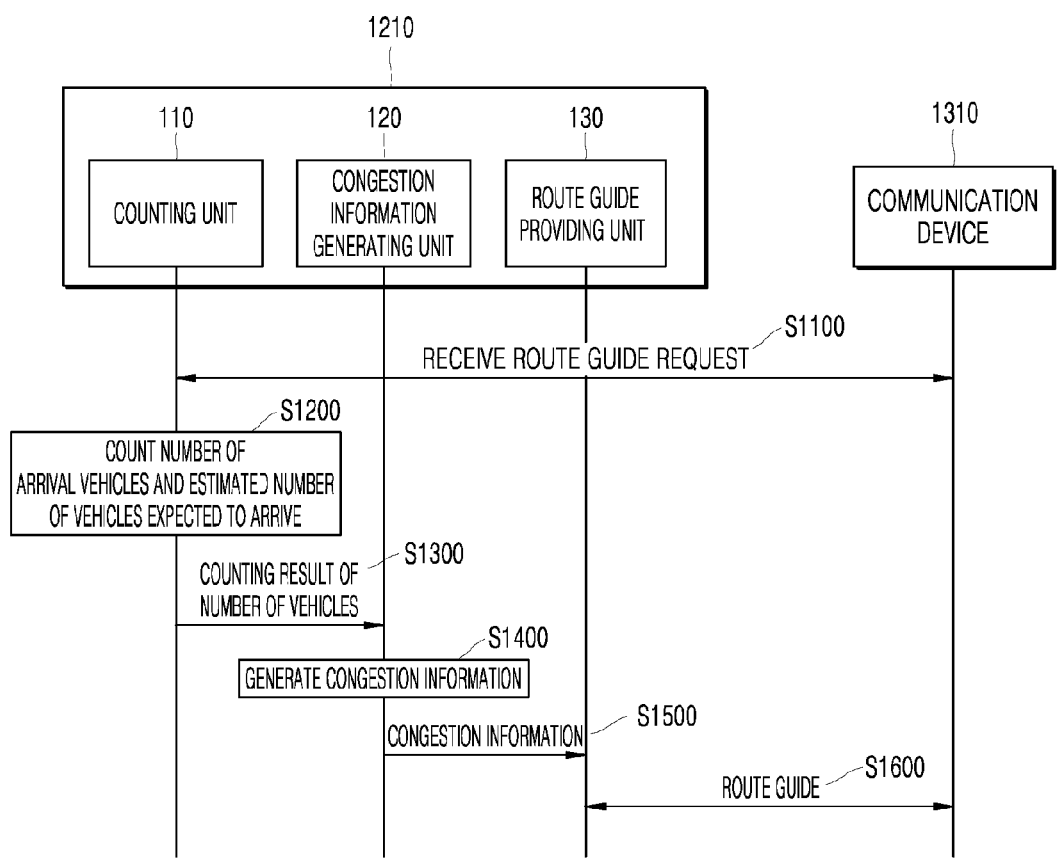
FIG. 7 is a flowchart for illustrating an operational flow in a hardware system for implementing a route guide apparatus according to an embodiment of the present disclosure.
Figure 8:
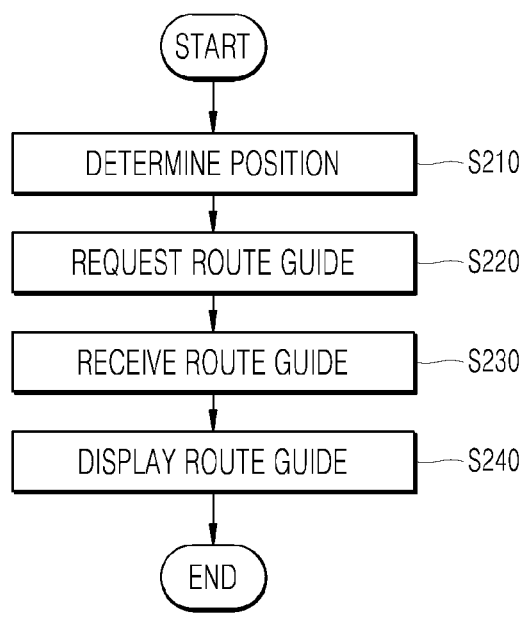
FIG. 8 is a flowchart for illustrating an operational flow in a terminal device according to an embodiment of the present disclosure.

Hereinafter, the route guide apparatus 100 according to an embodiment of the present disclosure and an operation flow in the hardware system 1000 for implementing the same will be described with reference to FIGS. 6 and 7. For the sake of convenience of explanation, the configurations illustrated in FIGS. 1 to 5 described above are explained with the corresponding reference numerals.

First of all, referring to FIG. 6, the operation flow in the route guide apparatus 100 according to an embodiment of the present disclosure is as follows.

When a route guide request for a specific location is received from the terminal device 200, the counting unit 110 counts the number of vehicles having already arrived at the specific location up to the moment that the route guide request is received, and the estimated number of vehicles expected to arrive (S110 to S120).

The number of arrival vehicles refers to the number of visitor vehicles counted to have already arrived at the specific location through the route guide to the specific location. To count the number of arrival vehicles as such, it is reasonable to manage historical information, which includes information on histories of having provided route guides to the specific location, on whether to arrive at the specific location through the route guide, or the like.

Ultimately, when the route guide request for the specific location is received from the terminal device 200, the counting unit 110 can count the number of arrival vehicles having arrive at the specific location through a manner of identifying the above-mentioned historical information up to the moment that the route guide request is received from the terminal device 200.

The estimated number of vehicles expected to arrive refers to the number of visitor vehicles expected to arrive at the specific location before the terminal device 200 or a vehicle mounting the terminal device arrives at the specific location.

The estimated number of vehicles expected to arrive can be counted by identifying a vehicle (receiver) receiving the route guide to the specific location, or by inquiring period statistical information in connection with the arrival vehicles.

In case of identifying a vehicle (receiver) receiving the route guide to the specific location, the counting unit 110 may determine the number of vehicles that have received the route guide to the specific location and are expected to arrive at the same time as the terminal device 200 or a vehicle mounting the terminal device 200 as the estimated number of vehicles expected to arrive.

It may be assumed that there may be any receiver that has received the route guide to the specific location and has the same departure as that of the terminal device 200 or a vehicle mounting the terminal device 200. In this case, it may be anticipated that route of the receiver having the same departure matches to a route to be guided to the terminal device 200.

Accordingly, in order to consider the receiver having the same departure as that of the terminal device 200 or a vehicle mounting the terminal device 200, the counting unit 110 may determine the number of vehicles that have received the route guide to the specific location, their routes to the specific location overlapping with the route of the terminal device more than a threshold distance but having not arrived at the specific location yet, as the estimated number of vehicles expected to arrive.

Further, in case of inquiring the period statistical information in connection with the arrival vehicles, the counting unit 110 inquires the period statistical information, which the numbers of past arrival vehicles are accumulated, e.g., on a time basis, on a day basis, on a day of week basis, on a event basis, and therethrough determines, as the number of the arrival schedule vehicles, the number of the past arrival vehicles having already arrived at the same time point as the time point when the terminal device 200 or a vehicle mounting the terminal device 200 is expected to arrive.

Then, when the number of arrival vehicles and the estimated number of vehicles expected to arrive to the specific location are counted, the congestion information generating unit 120 uses at least one of the counted numbers of arrival vehicles and arrival schedule vehicles to generate the congestion information (S130).

The congestion information generating unit 120 may generate, as each congestion information, the number of arrival vehicles at the time point when the route guide is requested from the terminal device 200 and the estimated number of vehicles expected to arrive at the time point when the terminal device 200 or a vehicle mounting the terminal device 200 is expected to arrive, or generate, as congestion information, the total number of visitors, corresponding to a result of summing the number of arrival vehicles and the estimated number of vehicles expected to arrive, at a time point when the terminal device 200 is expected to arrive.

When the estimated number of vehicles expected to arrive is counted from the period statistical information, it is reasonable that the number of arrival vehicles at the time point when the route guide is requested from the terminal device 200 may be exceptionally neglected and only the number of past arrival vehicles counted from the period statistical information is estimated to be the total number of visitors, thereby generating the congestion information.

For reference, the number of arrival vehicles at the time point when the route guide is requested from the terminal device 200 may be compared against the period statistical information.

That is to say, the congestion information generating unit 120 may check up a ratio of the number past arrival vehicles counted from the period statistical information compared to the route guide is requested from the terminal device 200 to the number of actual arrival vehicles.

The checked ratio may additionally be reflected onto the number of past arrival vehicles counted from the period statistical information with respect to the expected arrival time of the terminal device 200 or the vehicle mounting the terminal device 200, such that the congestion information may be generated.

For example, if the number of actual arrival vehicles at the time point when the route guide is requested from the terminal device 200 is more than the number of past arrival vehicles by a ratio of 120%, it may be anticipated that the number of past arrival vehicles counted from the period statistical information with respect to the expected arrival time of the terminal device 200 or the vehicle mounting the terminal device 200 may be varied.

Accordingly, the congestion information generating unit 120 may finally reflect the previously checked ratio of 120% onto the number of past arrival vehicles counted from the period statistical information with respect to the expected arrival time of the terminal 200 or the vehicle mounting the terminal device 200, such that the number of arrival vehicles more than the number of past arrival vehicles at the expected arrival time of the terminal device 200 by 120% is estimated to be the total number of visitors, thereby generating the congestion information.

Thereafter, when the congestion information on the specific location set as the destination by the terminal device 200 is generated, the route guide providing unit 130 may provide it together with the route guide to the specific location to the terminal device 200 such that a user carrying the terminal device 200 can previously discern the congestion information on the specific location (S140).

Hereinafter, the operation flow in the respective configurations within the hardware system 1000 for implementing the route guide apparatus 100 according to an embodiment of the present disclosure is described in detail with reference to FIG. 7.

For the sake of convenience of explanation, it is assumed that the respective configurations within the route guide apparatus 100 stored on the memory 1210 in a form of software modules is in a state of being executed by the processor 1100. When the route guide request to the specific location transmitted from the terminal device 200 is received by the communication device 1310, the counting unit 110 counts the number of vehicles having already arrived and the estimated number of vehicles expected to arrive at the specific location up to the time point when the route guide request is received from the terminal device 200, and then the delivers counting result to the congestion information generating unit 120 (S1100 to S1300).

The number of arrival vehicles refers to the number of visitor vehicles counted to have already arrived at the specific location through the route guide to the specific location. To count the number of arrival vehicles as such, it is reasonable to manage historical information, which includes information on histories of having provided route guides to the specific location, on whether to arrive at the specific location through the route guide, or the like.

Ultimately, when the route guide request for the specific location is received from the terminal device 200, the counting unit 110 can count the number of arrival vehicles having arrive at the specific location through a manner of identifying the above-mentioned historical information up to the moment that the route guide request is received from the terminal device 200.

The estimated number of vehicles expected to arrive refers to the number of visitor vehicles expected to arrive at the specific location before the terminal device 200 or a vehicle mounting the terminal device arrives at the specific location.

The estimated number of vehicles expected to arrive can be counted by identifying a vehicle (receiver) receiving the route guide to the specific location, or by inquiring period statistical information in connection with the arrival vehicles.

In case of identifying a vehicle (receiver) receiving the route guide to the specific location, the counting unit 110 may determine the number of vehicles that have received the route guide to the specific location and are expected to arrive at the same time as the terminal device 200 or a vehicle mounting the terminal device 200 as the estimated number of vehicles expected to arrive.

It may be assumed that there may be any receiver that has received the route guide to the specific location and has the same departure as that of the terminal device 200 or a vehicle mounting the terminal device 200. In this case, it may be anticipated that route of the receiver having the same departure matches to a route to be guided to the terminal device 200.

Accordingly, in order to consider the receiver having the same departure as that of the terminal device 200 or a vehicle mounting the terminal device 200, the counting unit 110 may determine the number of vehicles that have received the route guide to the specific location, their routes to the specific location overlapping with the route of the terminal device more than a threshold distance but having not arrived at the specific location yet, as the estimated number of vehicles expected to arrive.

As such, determining whether a route from the receiver to the specific location coincides with that of the terminal device 200 or a vehicle mounting the terminal device 200 more than a threshold distance is for considering a non-arriver having the same departure but different route, and thus may anticipate traffic congestion which may be incurred by the non-arriver in any section along the route of the terminal device 200 or the vehicle mounting the terminal device 200.

Further, in case of inquiring the period statistical information in connection with the arrival vehicles, the counting unit 110 inquires the period statistical information, which the numbers of past arrival vehicles are accumulated, e.g., on a time basis, on a day basis, on a day of week basis, on a event basis, and therethrough determines, as the number of the arrival schedule vehicles, the number of the past arrival vehicles having already arrived at the same time point as the time point when the terminal device 200 or a vehicle mounting the terminal device 200 is expected to arrive.

Then, when the counting result of the number of arrival vehicles and the estimated number of vehicles expected to arrive to the specific location are received, the congestion information generating unit 120 uses at least one of the counted numbers of arrival vehicles and arrival schedule vehicles to generate the congestion information and then delivers the generated result to the route guide providing unit 130 (S1400 to S1500).

The congestion information generating unit 120 may generate, as each congestion information, the number of arrival vehicles at the time point when the route guide is requested from the terminal device 200 and the estimated number of vehicles expected to arrive at the time point when the terminal device 200 or a vehicle mounting the terminal device 200 is expected to arrive, or generate, as congestion information, the total number of visitors, corresponding to a result of summing the number of arrival vehicles and the estimated number of vehicles expected to arrive, at a time point when the terminal device 200 is expected to arrive.

Thereafter, when the congestion information on the specific location is received, the route guide providing unit 130 may provide it together with the route guide to the specific location to the terminal device 200 through the communication device 1310 such that a user carrying the terminal device 200 can previously discern the congestion information on the specific location where the user oneself set as the destination (S1600).

Hereinafter, the terminal device 200 according to an embodiment of the present disclosure and an operation flow in a hardware system 2000 for implementing the same will be described with reference to FIGS. 6 and 7. For the sake of convenience of explanation, the configurations illustrated in FIGS. 1 to 5 described above are explained with the corresponding reference numerals.

First, the counting unit 210 performs a function for counting the current position (S210).

The counting unit 210 counts the current position, e.g., using a GPS (Global Positioning System) or the like for providing different positioning data such as latitude, longitude, and altitude without the limitations thereto.

Then, when a specific location is set as a destination by a user, the request unit 220 generates the route guide request to the specific location and delivers it to the route guide apparatus 100 (S220)

Of course, the current position of the terminal device 200 is included in the route guide request.

Furthermore, the receive unit 230 performs a function for receiving the route guide (S230).

Thereafter, the display unit 240 displays the route guide to the specific location, received from the route guide apparatus 100, together with the congestion information on the specific location, such that the user carrying the terminal device 200 can learn in advance the congestion information on the specific location where the user oneself set as the destination (S240).

Figure 9:
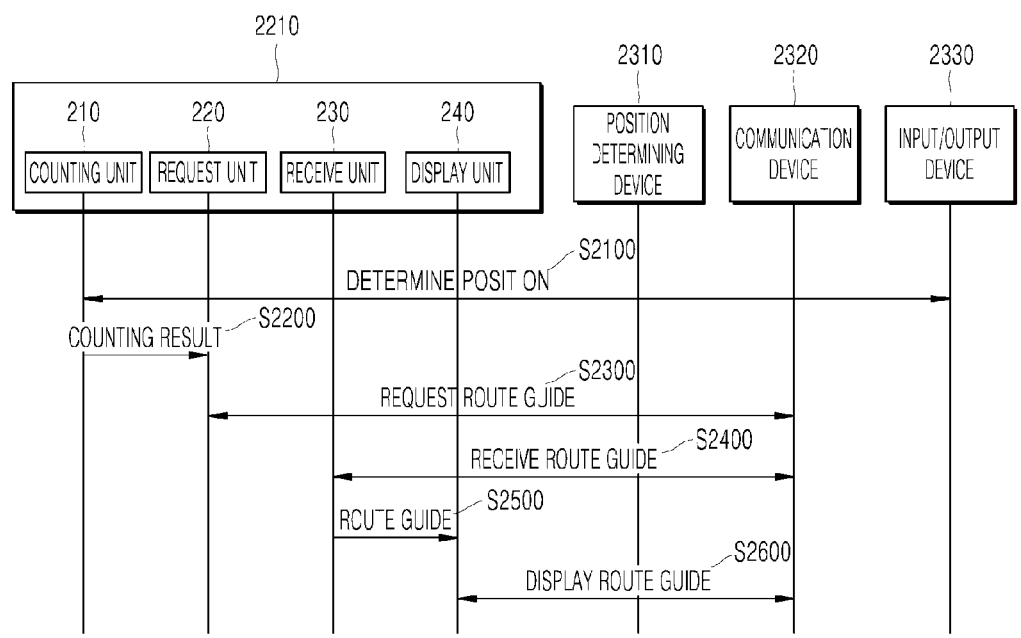
FIG. 9 is a flowchart for illustrating an operational flow in a hardware system for implementing a terminal device according to an embodiment of the present disclosure.

Hereinafter, the operation flow in the respective configurations within the hardware system 2000 for implementing the terminal device 200 according to an embodiment of the present disclosure is described in detail with reference to FIG. 9.

For the sake of convenience of explanation, it is assumed that the respective configurations within the terminal device 200 stored on the memory 2210 in a form of software modules is in a state of being executed by the processor 2100 through the memory interface 2200.

First, the counting unit 210 counts the current position corresponding to a departure of the terminal device 200 in connection with a route guide request through the position determining device 2310 and delivers the counted result to the request unit 220 (S2100 to S2200).

Then, when the current position of the terminal device 200 is received and a specific location is set as a destination by a user, the request unit 220 generates the route guide request to the specific location and delivers the generated route guide request to the route guide apparatus 100 through the communication device 2320 (S2300).

Furthermore, the receive unit 230 receives the route guide provided from the route guide apparatus 100 through the communication device 2320 according to the foregoing guide request and then delivers it to the display unit 240 (S2400 to S2500).

Thereafter, when the route guide is received, the display unit 240 displays the received route guide on a display 2341 through the input/output device 2300 and also displays the congestion information together with the route guide, such that the user carrying the terminal device 200 can learn in advance the congestion information on the specific location where the user oneself set as the destination (S2600).

As seen above, in the route guide apparatus 100 and the terminal device 200 according to an embodiment of the present disclosure, when the route information on the specific location is requested from the terminal device 200, the route guide apparatus 100 generates the congestion information considering the number of arrival vehicle having already arrived at the specific location and the estimated number of vehicles expected to arrive and then provides it to the terminal device 200, such that the user having requested the route guide can learn in advance the congestion information on the specific location.

For reference, although an embodiment of the present disclosure propose a configuration that the congestion information generated by the route guide apparatus 100 is provided to the terminal device 200 which has requested the route guide to the specific location, the configuration is not limited thereto and the congestion information may further be provided to a manager managing a workplace in the specific location. In this case, it may be anticipated that the manager may learn the number of visitor vehicles coming to the current workplace by using the congestion information and thus take actions in advance such as preparing a parking space, getting parking attendants ready, and so on.

Those skilled in the art would be able to understand that the present disclosure can be practiced in other specific forms without modifying its technical scope or the essential features. Thereafter, an embodiments described above should be comprehended to be exemplary in all aspects, not restricted.

For example, the terminal device 200 and the route guide apparatus 100 according to the present disclosure can store information on a memory, which is a computer readable medium in an implementation. The memory may be a volatile memory unit in an implementation and a nonvolatile memory unit in another implementation. Further, the memory may include, e.g., a hard disk device, an optical disc device, or any other massive storage device.

The terminal device 200 and the route guide apparatus 100 may also include, as an external input/output device, one or more network interface device such as an Ethernet card, a serial communication device such as a RS-232 port, and/or a wireless interface device such as a 802.11 card.

The terminal device 200 and the route guide apparatus 100 can be realized by instructions that, when being executed, cause one or more processing device to perform the foregoing functions and processes. The instructions, for example, may include interpretable instructions such as script instructions, e.g., JavaScript or ECMAScript, or executable codes or other instructions stored on the computer readable medium.

The terminal device 200 and the route guide apparatus 100 according to the present disclosure may be implemented in a distributed form over a network such as a Server Farm, or in a single computer apparatus.

The realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The term such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

The computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-end components in a computing system. The components of a system can be interconnected with each other by all types or media of digital data communication such as a communication network.

Although this specification includes details of various specific implementations, it is not to be understood as limiting for all inventions or scope to be claimed, and it should rather be understood as an explanation for the features which can be unique to specific implementations of the specific invention. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or subcombinations.

Also, although this specification depicts the operations in a specific order in the drawings, it is not to be understood that this specific sequence or order should be maintained or all the shown operations should be performed in order to obtain the preferred results In specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present invention to specific terms provided. Therefore, although the present invention has been explained in detail by referring to the aforementioned examples, it is possible for the person having ordinary skill in the art to alter, change, or modify these examples without departing from the scope of the present invention. The scope of the present invention is expressed by the claims, not by the specification, and all changes and modified shapes derived from the meanings of the claims, scopes, and the equivalents thereof are construed to be included in the scope of the present invention.

What is claimed is:

1. A route guide apparatus, comprising:
   a processor comprising:
   a counting unit configured to count, when a signal for requesting a route guide to a specific location is received from a terminal device, at least one of a number of vehicles having already arrived at the specific location and an estimated number of vehicles expected to arrive at the specific location based on information on histories of other terminal devices which are provided with route guides to the specific location; and
   a congestion information generating unit configured to generate congestion information in connection with the specific location based on the at least one of the number of arrival vehicles and the estimated number of vehicles expected to arrive such that the route guide comprising the congestion information is provided,
   wherein the estimated number of vehicles expected to arrive includes a number of vehicles that have received the route guide to the specific location, the route guides to the specific location overlapping with the route of the terminal device by more than a threshold distance, but having not arrived at the specific location.

2. The route guide apparatus of claim 1, wherein the estimated number of vehicles expected to arrive includes the number of vehicles that have received the route guide to the specific location and are expected to arrive earlier than the terminal device.

3. The route guide apparatus of claim 1, wherein the estimated number of vehicles expected to arrive includes the number of arrived vehicles in the past, which is obtained from statistical information regarding a time point when the terminal device is expected to arrive.

4. The route guide apparatus of claim 1, wherein the congestion information further includes the number of vehicles that can be parked in parking lots in the specific location at a time point when the terminal device is expected to arrive.

5. The route guide apparatus of claim 1, wherein the congestion information is generated as guide information on a time basis irrespectively of whether or not a route guide request received from the terminal device, and is provided in real time in response to a request from a service receiver related to the specific location.

6. A control method performed by a route guide apparatus comprising a processor, the processor to execute the control method comprising:
   receiving a signal for requesting a route guide to a specific location is received from a terminal device;
   counting, in response to the signal requested from the terminal device, at least one of a number of vehicles having already arrived at the specific location and an estimated number of vehicles expected to arrive at the specific location based on information on histories of other terminal devices which are provided with route guides to the specific location; and
   generating congestion information in connection with the specific location based on the at least one of the number of arrival vehicles and the estimated number of vehicles expected to arrive such that the route guide comprising the congestion information is provided,
   wherein the estimated number of vehicles expected to arrive includes a number of vehicles that have received the route guide to the specific location the route guides to the specific location overlapping with the route of the terminal device by more than a threshold distance, but having not arrived at the specific location.

7. The control method of claim 6, wherein the estimated number of vehicles expected to arrive includes the number of vehicles that have received the route guide to the specific location and are expected to arrive earlier than the terminal device but not arrived at the specific location yet.

8. The control method of claim 6, wherein the estimated number of vehicles expected to arrive includes the number of arrived vehicles in the past, which is obtained from statistical information regarding a time point when the terminal device is expected to arrive.

9. The control method of claim 6, wherein the congestion information further includes the number of vehicles that can be parked in parking lots in the specific location at a time point when the terminal device is expected to arrive.

10. The control method of claim 6, wherein the congestion information is generated as guide information on a time basis irrespectively of whether or not a route guide request received from the terminal device, and is provided in real time in response to a request from a service receiver related to the specific location.

11. A non-transitory recording medium storing instructions for providing congestion information on a specific location, when the instructions are executed in a route guide apparatus including a processor, the processor causing the instruction to implement
- receiving a signal for requesting a route guide to a specific location is received from a terminal device;
- counting, in response to the signal requested from the terminal device, at least one of a number of vehicles having already arrived at the specific location and an estimated number of vehicles expected to arrive at the specific location based on information on histories of other terminal devices which are provided with route guides to the specific location; and
- generating congestion information in connection with the specific location based on the at least one of the number of arrival vehicles and the estimated number of vehicles expected to arrive such that the route guide comprising the congestion information is provided,
- wherein the estimated number of vehicles expected to arrive includes a number of vehicles that have received the route guide to the specific location the route guides to the specific location overlapping with the route of the terminal device by more than a threshold distance, but having not arrived at the specific location.

* * * * *